E. J. BURRALL.
Fertilizer.
No. 23,899.
Patented May 10. 1859.
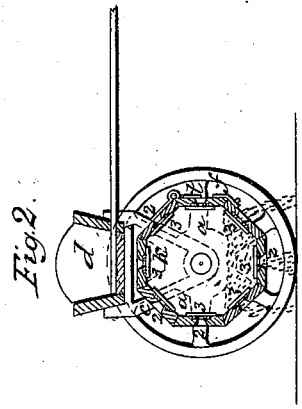
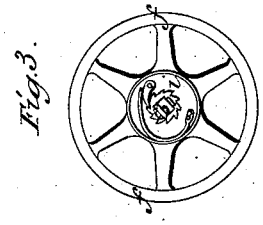
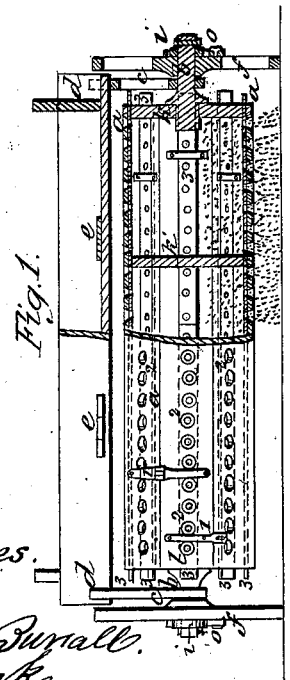
Witnesses.
Thomas V. Burrall.
Ralph Clark.
Inventor.
Elisha J. Burrall.

UNITED STATES PATENT OFFICE.

ELISHA J. BURRALL, OF GENEVA, NEW YORK.

IMPROVEMENT IN MACHINES FOR SOWING FERTILIZERS.

Specification forming part of Letters Patent No. 23,899, dated May 10, 1859.

*To all whom it may concern:*

Be it known that I, ELISHA J. BURRALL, of Geneva, in the county of Ontario and State of New York, have invented, made, and applied to use a certain new and useful Improvement in Machines for Spreading Lime, Guano, &c.; and I do hereby declare that the following is a full, clear, and exact description of the construction and operation of the same, reference being had to the annexed drawings, making part of this specification, wherein—

Figure 1 is a side view of my spreader with a portion thereof broken open to show the interior parts. Fig. 2 is a central cross-section of my said machine; and Fig. 3 is the exterior of one of the wheels supporting my apparatus.

Similar marks of reference denote the same parts.

Several machines for spreading or sowing lime, guano, &c., broadcast have been before devised. Most all of them, however, are liable to become clogged and obstructed by any lumps—such as unburned oyster-shells, small stones, &c.—getting into the openings from which the material is delivered. My invention obviates all these difficulties, and partakes of the character of a rotary sieve, out of which the lime or other material to be spread or sowed broadcast is shaken by the revolutions of the receptacle holding the same, whereby the openings are kept clear and free, and any lumps too large or hard to be broken by the agitation are retained in said receptacle and emptied out when desired. To accomplish this purpose I mount a cylinder or prism, $a$, on gudgeons or axles $b$ $b$, which revolve in the fixed bearings $c$ $c$ on the lower side of the carriage $d$, that may be formed as a box, as shown, to receive a second charge for the revolving prism.

$e$ $e$ are the shafts or pole to which the animal or animals are attached to draw the machine.

$f$ $f$ are wheels setting onto the outer ends of the axles or gudgeons $b$ $b$.

$i$ $i$ are ratchet-wheels secured on squares at the ends of said gudgeons, and $o$ $o$ are pawls attached to the wheel-hub, kept to the ratchet-wheels by springs, the operation of which ratchet-wheels and pawls is to give rotation to the cylinder or prism $a$ when the machine is drawn forward, and permit the same to remain stationary when the wheels revolve on said gudgeons or axles $b$ $b$ in backing.

The cylinder or prism is constructed of wood or other material in a hollow form, having the heads $k$ $k$ at the ends and divisions $k'$ $k'$ at suitable points along its length to prevent the contents working toward one end when the machine is being used on a hillside or other than level ground. Said cylinder is provided with a lid or flap, $l$, attached by hinges or hoops 1 1, or otherwise, so that any desired charge can be put into the said cylinder or prism and secured therein. In the sides of said cylinder or prism rows of holes 2 2 are provided at suitable distance apart, and of as large size as ever required.

3 3 are perforated sliding plates retained in contact with the inner sides of said cylinder or prism on the line of the holes, the perforations corresponding in size and position, so that the openings can be regulated, according to the amount required to be delivered, by moving said plates 3 3 endwise; or the holes can be entirely closed by said slides while going to the field or whenever necessary.

Having thus described the nature and operation of my machine for spreading lime, manure, &c., I remark that the simplicity, durability, cheapness, and efficiency will be fully apparent to the agriculturist.

I do not claim a revolving screen or sieve in itself. Neither do I claim regulating openings by perforated slides, separately considered; but

What I claim as my invention, and desire to secure by Letters Patent, is—

The arrangement of the revolving cylinder $a$, divisions $k'$, and adjustable perforated slides 3 3, in the manner and for the purposes substantially as specified.

In witness whereof I have hereunto set my signature this 10th day of January, 1859.

ELISHA J. BURRALL.

Witnesses:
THOMAS D. BURRALL,
RALPH CLARK.